(12) United States Patent
Johnson et al.

(10) Patent No.: US 9,500,210 B2
(45) Date of Patent: Nov. 22, 2016

(54) AIRBAG ANCHORING CLIP ASSEMBLY

(71) Applicant: ILLINOIS TOOL WORKS INC., Glenview, IL (US)

(72) Inventors: Lawrence W. Johnson, Taylor, MI (US); Marc R. Risdale, Dundas (CA); James T. Kirchen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 291 days.

(21) Appl. No.: 14/382,000

(22) PCT Filed: Feb. 27, 2013

(86) PCT No.: PCT/US2013/027873
§ 371 (c)(1),
(2) Date: Aug. 29, 2014

(87) PCT Pub. No.: WO2013/130496
PCT Pub. Date: Sep. 6, 2013

(65) Prior Publication Data
US 2015/0026934 A1 Jan. 29, 2015

Related U.S. Application Data

(60) Provisional application No. 61/605,862, filed on Mar. 2, 2012, provisional application No. 61/637,381, filed on Apr. 24, 2012.

(51) Int. Cl.
*B60R 13/02* (2006.01)
*F16B 5/06* (2006.01)
(Continued)

(52) U.S. Cl.
CPC .............. *F16B 5/06* (2013.01); *B60R 21/20* (2013.01); *F16B 21/02* (2013.01); *Y10T 24/44026* (2015.01)

(58) Field of Classification Search
CPC .......... F16B 5/06; F16B 21/02; F16B 5/126; F16B 5/128; F16B 37/043; F16B 5/065; F16B 5/0657; B60R 21/20; B60R 13/0206; B60R 13/04; B60N 3/026
USPC .......................................................... 24/458
See application file for complete search history.

(56) References Cited

U.S. PATENT DOCUMENTS 5,502,942 A * 4/1996 Gras ................... B60R 13/0206
24/295
5,533,237 A * 7/1996 Higgins .................. F16B 5/065
24/289

(Continued)

FOREIGN PATENT DOCUMENTS

CN          101068697 A     11/2007
DE       202005018240 U1     4/2006

(Continued)

OTHER PUBLICATIONS

ISR and WO for PCT/US2013/027873 mailed Jun. 25, 2013.

*Primary Examiner* — Robert J Sandy
*Assistant Examiner* — Jason W San
(74) *Attorney, Agent, or Firm* — Joseph M. Butscher; The Small Patent Law Group, LLC

(57) ABSTRACT

An anchoring clip assembly is configured to securely anchor to a structure. The assembly may include a main body, a plurality of anchoring members extending from the main body, wherein the plurality of anchoring members are configured to securely anchor to the structure, and at least one verification member configured to provide verification when the plurality of anchoring members are securely anchored to the structure. The verification member(s) may provide visual verification when the plurality of anchoring members are securely anchored to the structure, and/or may include at least one separable portion that is configured to separate from the main body after the plurality of anchoring members are securely anchored to the structure.

26 Claims, 10 Drawing Sheets

(51) Int. Cl.
*B60R 21/20* (2011.01)
*F16B 21/02* (2006.01)

(56) References Cited

U.S. PATENT DOCUMENTS

| | | | |
|---|---|---|---|
| 5,636,891 A * | 6/1997 | Van Order | B60N 3/026 224/313 |
| 5,857,735 A * | 1/1999 | Alonso Cuesta | B60R 11/00 296/214 |
| 5,975,820 A * | 11/1999 | Kirchen | F16B 5/0628 411/339 |
| 6,141,837 A | 11/2000 | Wisniewski | |
| 6,431,585 B1 * | 8/2002 | Rickabus | B60R 21/215 24/114.05 |
| 6,438,804 B1 * | 8/2002 | Romero Magarino | B60R 13/0206 24/289 |
| 6,450,747 B1 * | 9/2002 | Fischer | F16B 27/00 206/338 |
| 6,453,522 B1 * | 9/2002 | Romero Magarino | B60R 13/0206 24/289 |
| 6,644,713 B2 * | 11/2003 | Del Pozo Abejon | B60N 3/026 296/146.7 |
| 7,073,231 B2 * | 7/2006 | Draggoo | B60R 13/0206 24/297 |
| 7,086,125 B2 * | 8/2006 | Slobodecki | B60R 13/0206 24/293 |
| 7,152,281 B2 * | 12/2006 | Scroggie | B60R 13/0206 24/289 |
| 7,226,260 B2 * | 6/2007 | Jackson, Jr. | F16B 21/076 411/112 |
| 7,338,068 B2 * | 3/2008 | Kawai | B60R 21/215 24/297 |
| 7,370,878 B2 * | 5/2008 | Nakazawa | B60R 21/213 16/2.1 |
| 7,523,959 B2 * | 4/2009 | Kawai | B60R 21/213 280/728.2 |
| 7,614,836 B2 * | 11/2009 | Mohiuddin | B60R 13/0206 411/508 |
| 7,640,635 B2 * | 1/2010 | Kim | B60J 3/0213 24/295 |
| 7,828,372 B2 * | 11/2010 | Ellison | B60R 13/04 24/297 |
| 7,871,102 B2 | 1/2011 | Slobodecki et al. | |
| 7,878,745 B2 * | 2/2011 | Allen | F16B 27/00 206/338 |
| 7,976,056 B2 * | 7/2011 | Kirchen | B60R 13/0206 280/728.2 |
| 8,016,530 B2 * | 9/2011 | Johnson | F16B 5/065 411/173 |
| 8,083,450 B1 * | 12/2011 | Smith | F16B 37/044 411/111 |
| 8,316,513 B2 * | 11/2012 | DeJong | F16B 5/065 24/293 |
| 8,376,392 B2 * | 2/2013 | Staebler | 280/728.2 |
| 8,568,073 B2 * | 10/2013 | Eberle | B60R 13/0206 24/662 |
| 8,627,552 B2 * | 1/2014 | Smith | F16B 5/0657 24/295 |
| 9,056,593 B2 * | 6/2015 | Risdale | B60R 21/216 |
| 9,156,414 B2 * | 10/2015 | Diez Herrera | F16B 37/043 |
| 2001/0032377 A1 * | 10/2001 | Lubera | B60N 3/026 24/293 |
| 2001/0046426 A1 * | 11/2001 | Lubera | B60N 3/026 411/182 |
| 2002/0005464 A1 | 1/2002 | Miura | |
| 2002/0056175 A1 * | 5/2002 | Magarino | B60R 13/0206 24/289 |
| 2004/0049894 A1 * | 3/2004 | Jackson, Jr. | B60R 13/0206 24/293 |
| 2004/0151560 A1 * | 8/2004 | Kirchen | F16B 19/008 411/508 |
| 2005/0117993 A1 * | 6/2005 | Vassiliou | F16B 37/02 411/173 |
| 2006/0032029 A1 * | 2/2006 | Nessel | B60R 13/0206 24/289 |
| 2006/0168773 A1 * | 8/2006 | Smith | F16B 5/0657 24/295 |
| 2007/0280804 A1 * | 12/2007 | Selle | F16B 5/0642 411/520 |
| 2008/0086850 A1 * | 4/2008 | Smith | B60R 13/0206 24/289 |
| 2008/0122244 A1 * | 5/2008 | Kwon | B60N 3/026 296/71 |
| 2008/0159824 A1 * | 7/2008 | Okada | F16B 37/02 411/177 |
| 2008/0286066 A1 * | 11/2008 | Paquet | F16B 37/043 411/177 |
| 2010/0066061 A1 | 3/2010 | Slobodecki et al. | |
| 2011/0232049 A1 * | 9/2011 | Ribes Marti | B60R 21/213 24/458 |
| 2011/0302765 A1 * | 12/2011 | Marx | B60R 13/0206 29/525.01 |
| 2012/0023715 A1 | 2/2012 | Nakajima | |
| 2012/0125960 A1 * | 5/2012 | Diez Herrera | F16B 37/043 224/309 |
| 2015/0175017 A1 * | 6/2015 | Jeong | F16B 2/10 24/489 |
| 2015/0232130 A1 * | 8/2015 | Colombo | F16B 5/0657 403/14 |
| 2016/0016522 A1 * | 1/2016 | Smith | F16B 37/043 296/35.1 |

FOREIGN PATENT DOCUMENTS

| | | |
|---|---|---|
| JP | 2001193718 A | 7/2001 |
| WO | 03/100267 A1 | 12/2003 |
| WO | 2008/141052 A2 | 11/2008 |
| WO | 2010101216 A1 | 9/2010 |

* cited by examiner

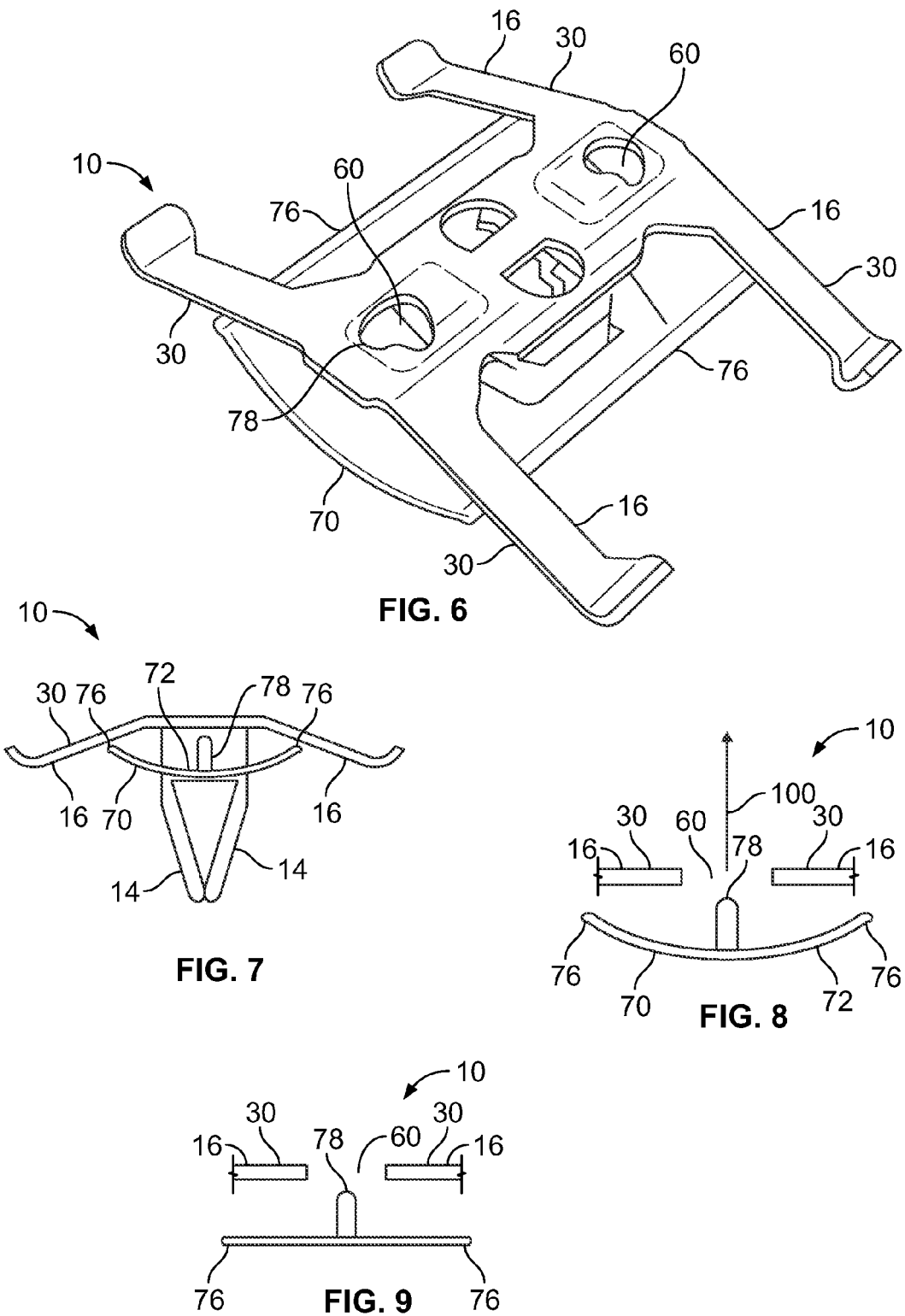

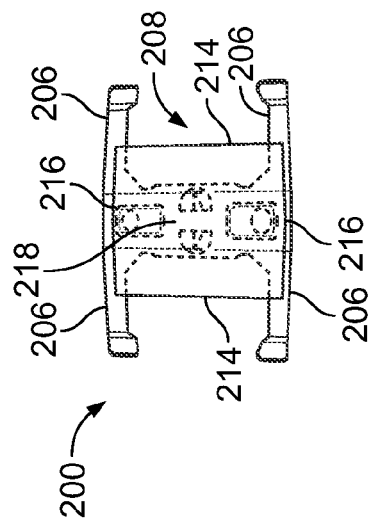
FIG. 15
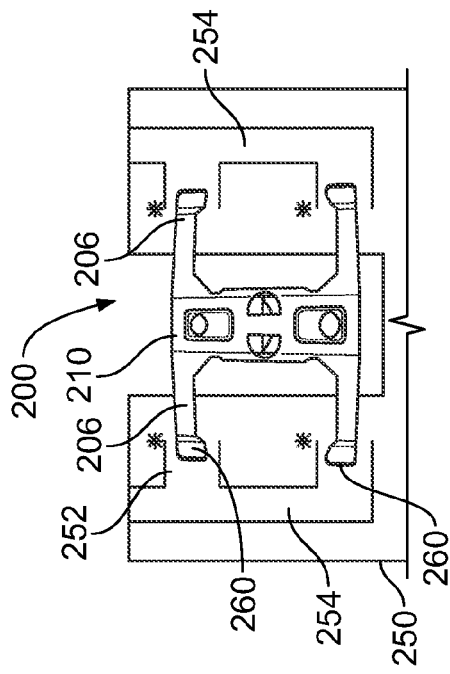
FIG. 17
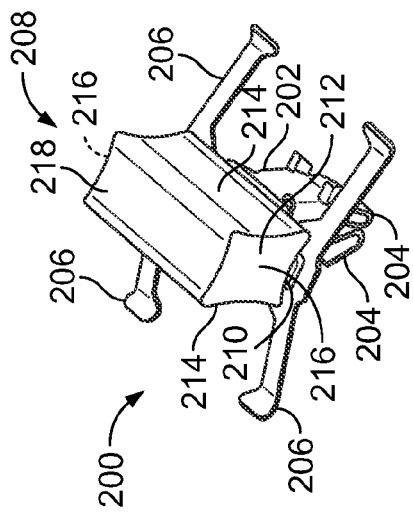
FIG. 14
FIG. 16

AIRBAG ANCHORING CLIP ASSEMBLY

RELATED APPLICATIONS

The present application is National Phase of International Application Number PCT/US2013/027873 filed Feb. 27, 2013 and claims priority benefits from U.S. Provisional Patent Application No. 61/605,862 entitled "Airbag Clip Assembly," filed Mar. 2, 2012, which is hereby incorporated by reference in its entirety.

The present application also relates to and claims priority benefits from U.S. Provisional Patent Application No. 61/637,381 entitled "Airbag Clip Assembly," filed Apr. 24, 2012, which is also hereby incorporated by reference in its entirety.

FIELD OF EMBODIMENTS OF THE DISCLOSURE

Embodiments of the present disclosure generally relate to a clip assembly configured to securely anchor an airbag to a frame, panel, pillar, or the like of a vehicle.

BACKGROUND

Various vehicles, such as automobiles, include airbags located within or proximate to an interior cabin. For example, an airbag may be securely anchored within a steering wheel, proximate to a dashboard or glove compartment, within side door panels, and the like. Typically, each airbag is secured to a frame, panel or other such structural feature of the vehicle. Upon impact of sufficient force, the airbag deploys into the cabin, while remaining securely anchored to the frame or panel through a fastening clip, for example.

During installation of the airbags into the vehicle, each fastening clip is securely connected to a portion of the frame or panel. Otherwise, during airbag deployment, the airbag would eject into and throughout the cabin of the vehicle, which would undermine the purpose of the airbag, and potentially cause injury to occupants of the vehicle. Therefore, manufacturers typically ensure that the fastening clips are securely anchored to the frame or panel portions of the vehicle.

During installation, care is generally taken to confirm that the fastening clips are, in fact, securely anchored to the portions of the vehicle. Often, an individual installer typically physically inspects and manipulates each fastening clip to ensure proper anchoring. As an example, an installer may use a tool to attempt to pry the fastening clip loose. If the installer is able to remove the fastening clip with the tool, then it is evident that the fastening clip is not anchored to the vehicle frame or panel. As can be appreciated, the process of physically examining and manipulating each and every fastening clip may be tedious and time-consuming.

SUMMARY OF EMBODIMENTS OF THE DISCLOSURE

Certain embodiments of the present disclosure provide an anchoring clip assembly configured to securely anchor to a structure of a vehicle. The anchoring clip assembly may include a main body, one or more insertion members extending from the main body, wherein the insertion member(s) are configured to be inserted into a portion of the structure, one or more anchoring members extending from the main body, wherein the anchoring member(s) are configured to securely anchor to the structure, and at least one verification member configured to provide verification when the anchoring member(s) are securely anchored to the structure.

The verification member(s) may provide visual verification when the anchoring member(s) are securely anchored to the structure. For example, the verification member(s) may include a base sheet having a central opening formed therethrough. The main body is configured to be positioned through the central opening. Outer pivot beams extend from distal edges of the base sheet. At least one verification indicator extends from the base sheet. The verification indicator(s) are configured to extend through a portion of the main body when the anchoring member(s) are securely anchored to the structure. The verification member may also include an opposed sheet over the base sheet. The opposed sheet may include at least one wiper seal aligned with the verification indicator(s). The verification indicator(s) are configured to pass through the at least one wiper seal when the anchoring member(s) are securely anchored to the structure. The base sheet may be outwardly bowed in an at-rest position. The verification indicator(s) may include an upstanding column having a beveled tip.

In at least one embodiment, the verification member(s) may include at least one separable portion that is configured to separate from the main body after the anchoring member(s) are securely anchored to the structure. The verification member(s) may include a verification handle that is configured to be separated from the main body when the anchoring member(s) are securely anchored to the structure. The verification handle may be configured to be removed from the main body with one hand when the one or anchoring member(s) are securely anchored to the structure. Conversely, the verification handle may be unable to be removed from the main body with one hand when the anchoring member(s) are not securely anchored to the structure.

In at least one embodiment, the verification member(s) may include a verification pin that is configured to be separated from the main body when the anchoring member(s) are securely anchored to the structure. The verification pin may be configured to be removed from the main body with one hand when the anchoring member(s) are securely anchored to the structure. Conversely, the verification pin may be unable to be removed from the main body with one hand when the anchoring member(s) are not securely anchored to the structure.

Certain embodiments of the present disclosure provide an anchoring clip assembly configured to securely anchor to a structure. The anchoring clip assembly may include a main body, a plurality of anchoring members extending from the main body, wherein the plurality of anchoring members are configured to securely anchor to the structure; and at least one verification member configured to provide verification when the plurality of anchoring members are securely anchored to the structure. The verification member(s) are configured to provide visual verification when the plurality of anchoring members are securely anchored to the structure, and/or includes at least one separable portion that is configured to separate from the main body after the plurality of anchoring members are securely anchored to the structure.

Certain embodiments of the present disclosure provide an anchoring clip assembly configured to securely anchor an airbag to a structure of a vehicle. The anchoring clip assembly may include a main body, opposed insertion members that extend from the main body, wherein the opposed insertion members are configured to be inserted into a portion of the structure, two pairs of anchoring members extending from the main body, wherein the two pairs of anchoring members are configured to securely anchor to the structure, and at least one verification member configured to provide verification when the two pairs of anchoring members are securely anchored to the structure. The verification member(s) provide visual verification when the two pairs of anchoring members are securely anchored to the structure, and/or includes at least one separable portion that is configured to separate from the main body after the two pairs of anchoring members are securely anchored to the structure.

BRIEF DESCRIPTION OF SEVERAL VIEWS OF THE DRAWINGS

FIG. 6 illustrates an isometric top view of an airbag anchoring clip assembly having a verification member, according to an embodiment of the present disclosure.

FIG. 7 illustrates a simplified cross-sectional view of an airbag anchoring clip assembly in an unsecured position, according to an embodiment of the present disclosure.

FIG. 8 illustrates a simplified cross-sectional view of a verification member in relation to an alignment window of an airbag anchoring clip assembly in an unsecured position, according to an embodiment of the present disclosure.

FIG. 9 illustrates a simplified cross-sectional view of a verification member in relation to an alignment window of an airbag anchoring clip assembly in an anchored position, according to an embodiment of the present disclosure.

FIG. 14 illustrates an isometric top view of an airbag anchoring clip assembly, according to an embodiment of the present disclosure.

FIG. 15 illustrates a top plan view of an airbag anchoring clip assembly, according to an embodiment of the present disclosure.

FIG. 16 illustrates a transverse cross-sectional view of an airbag anchoring clip assembly, according to an embodiment of the present disclosure.

FIG. 17 illustrates a top view of an airbag anchoring clip assembly positioned on a structure of a vehicle, according to an embodiment of the present disclosure.

Figure 1:
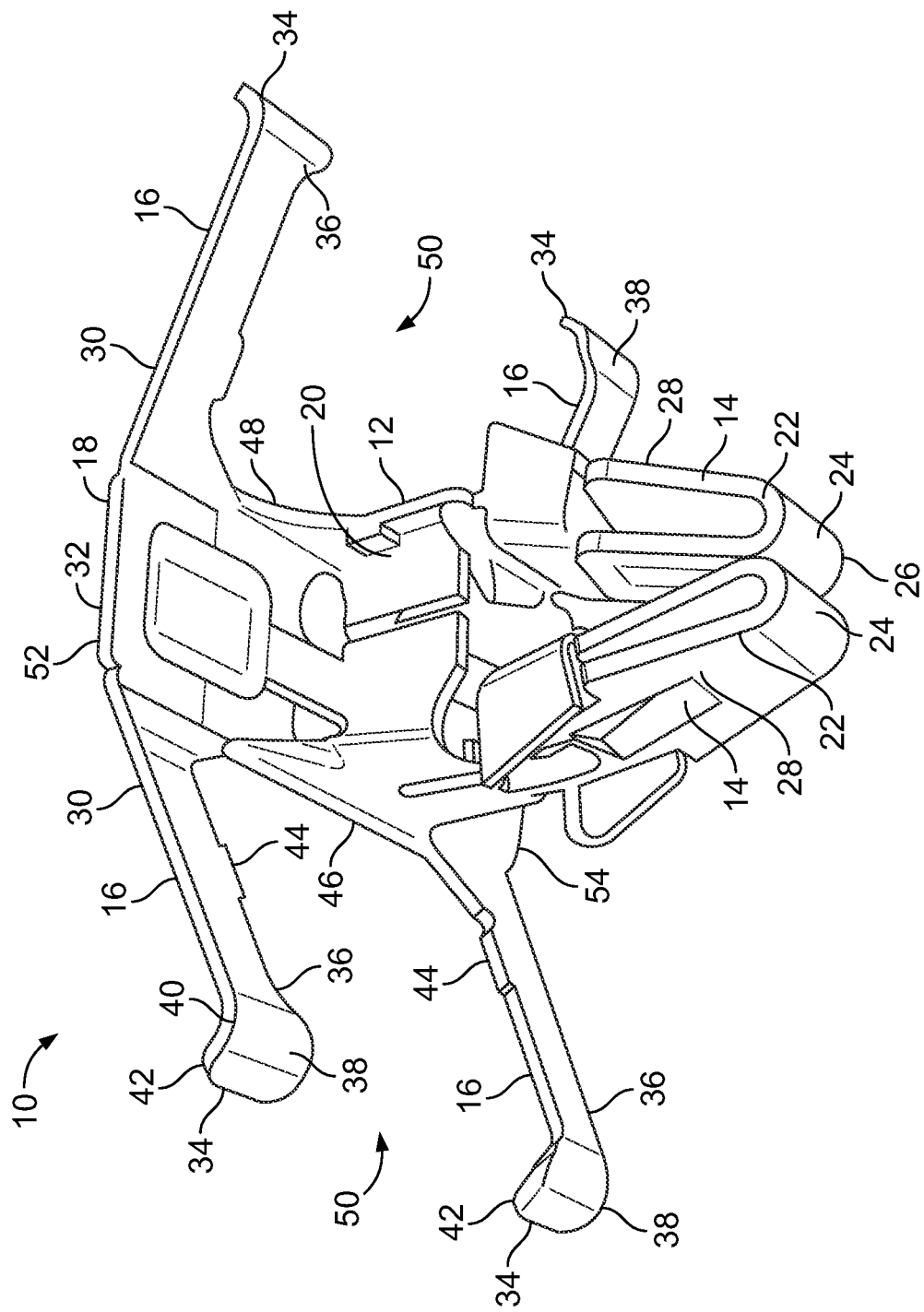
FIG. 1 illustrates an isometric bottom view of an airbag anchoring clip assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates an isometric bottom view of an airbag anchoring clip assembly 10, according to an embodiment of the present disclosure. The assembly 10 includes a main body 12 having insertion members 14 extending downwardly therefrom, and one or more anchoring members 16 extending laterally outward from an upper end 18.

The main body 12 may include outer walls 20 that form a box-like structure. The outer walls 20 may be formed of metal, plastic, or the like, and may be wrapped or otherwise formed to form a central box-like frame. Optionally, the main body 12 may be formed as various other shapes and sizes, such as a cylindrical central post.

The insertion members 14 extend downwardly from the main body 12, and may be integrally molded and formed with the main body 12. The insertion members 14 may include folded straps 22 having smooth rounded folds 24 at a bottom end 26 of the assembly 10. The rounded folds 24 may be the leading portions of the insertion members 14 that are configured to lead the assembly 10 into a reciprocal opening, channel, or the like of a vehicle frame, panel, or other structural feature.

As shown in FIG. 1, the assembly 10 may include two insertion members 14 that converge toward one another proximate to the bottom end 26. The opposed insertion members 14 may provide a ramped lead-in nose defined by outer strap surfaces 28 that angle toward one another. The lead-in nose includes the opposed rounded ends 24 that may abut into one another. In operation, the opposed insertion members 14 may be inserted into a reciprocal hole, channel, opening, or passage formed through a vehicle panel, frame, or the like. While the assembly 10 is shown with two insertion members 14, more or less insertion members 14 may be used.

Each anchoring member 16 includes a resilient beam 30 that extends outwardly from a top wall 32 of the assembly 10. The top wall 32 may be integrally formed and molded within the main body 12. Each resilient beam 30 extends outwardly and downwardly from the top wall 32 and may generally be spring-biased. For example, each resilient beam 30 may be a leaf spring configured to resiliently flex. An anchoring protuberance 34 extends from a distal end 36 of each resilient beam 30. The anchoring protuberance 34 may include an expanded body 38 that is wider than the resilient beam 30. The expanded body 38 includes a curved portion 40 that upwardly turns from the resilient beam 30. The curved portion 40, in turn, integrally connects to an upturned edge 42, which is configured to securely lock into a reciprocal feature of a vehicle frame, panel, or the like.

Each resilient beam 30 may also include one or more securing tabs 44 that is coplanar with the resilient beam 30 and extends laterally therefrom. The securing tab 44 may also be configured to securely lock into a reciprocal feature of a vehicle frame, panel, or the like.

As shown in FIG. 1, the assembly 10 includes four anchoring members 16. A pair of anchoring members 16 extends from each side 46 and 48 of the assembly 10. Each anchoring member 16 within a pair may be separated by a gap 50. As shown, the anchoring members 16 may extend laterally from ends 52 and 54 of the assembly 10. While the assembly 10 is shown having two pairs of anchoring members 16, more or less anchoring members 16 may be used. For example, the assembly 10 may include a single anchoring member 16 extending from each side 46 and 48 of the assembly 10. Further, the assembly 10 may optionally include single anchoring members that may be formed as contiguous straps of material that extend between the ends 52 and 54 of the assembly 10. Also, while the anchoring beams 16 are shown as extending laterally proximate to the ends 52 and 54, the assembly 10 may include one or more anchoring beams that extend longitudinally from the ends 52 and 54.

Figure 2:
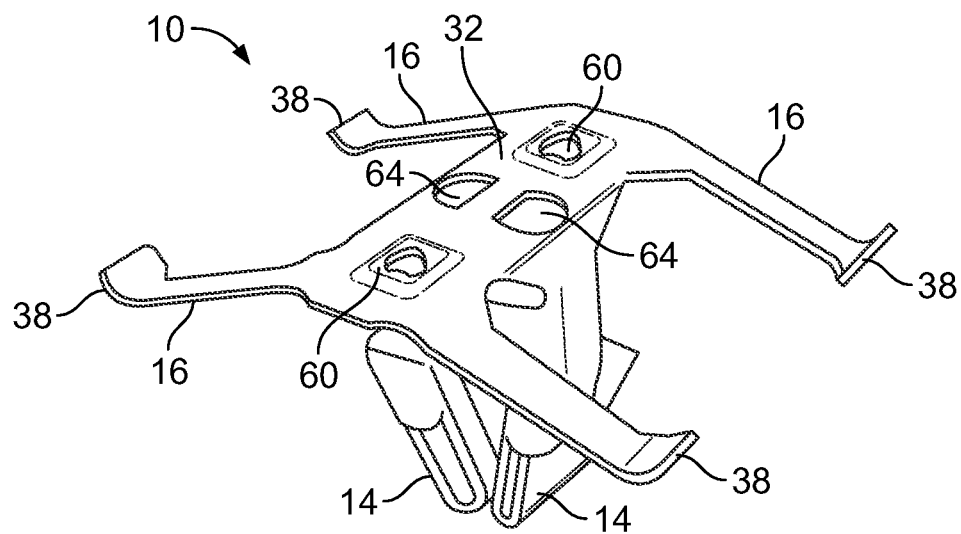
FIG. 2 illustrates an isometric top view of an airbag anchoring clip assembly, according to an embodiment of the present disclosure.
Figure 3:
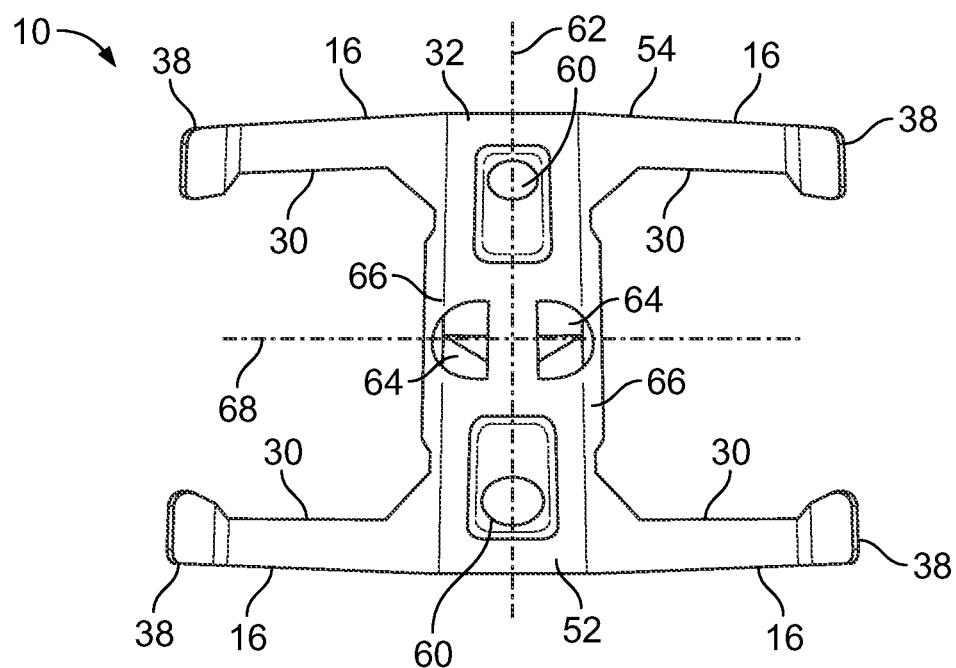
FIG. 3 illustrates a top plan view of an airbag anchoring clip assembly, according to an embodiment of the present disclosure.

FIGS. 2 and 3 illustrate isometric top and top plan views, respectively, of the airbag anchoring clip assembly 10, according to an embodiment of the present disclosure. Referring to FIGS. 2 and 3, anchoring-verification windows 60 may be formed through the top wall 32 of the assembly 10. As shown, two anchoring-verification windows 60 may be formed proximate to the ends 52 and 54 of the assembly 10. For example, one anchoring-verification window 60 may be proximate to the end 52, while the other anchoring-verification window 60 may be proximate to the end 54. The anchoring-verification windows 60 may be aligned along a longitudinal axis 62 of the assembly 10.

Figure 22:
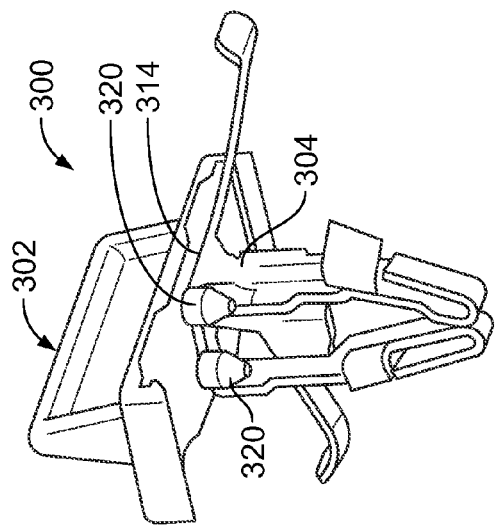
FIG. 22 illustrates a partial internal view of an airbag anchoring clip assembly, according to an embodiment of the present disclosure.

The assembly 10 may also include interior alignment windows 64 that are inboard from the anchoring-verification windows 60. The interior alignment windows 64 may be proximate to lateral edges 66 of the top wall 32, and may generally be aligned with a lateral axis 68 of the assembly 10. The interior alignment windows 64 may be configured to receive reciprocal features of a verification handle (as shown in FIG. 22, for example) in order to align the verification handle with the main body 12.

While the assembly 10 is shown with two anchoring-verification windows 60 and two interior alignment windows 64, more or less windows may be used. For example, the assembly 10 may not include the interior alignment windows 64. As another example, only a single, central window that is aligned with the center of the assembly 10 may be used.

Figure 4:
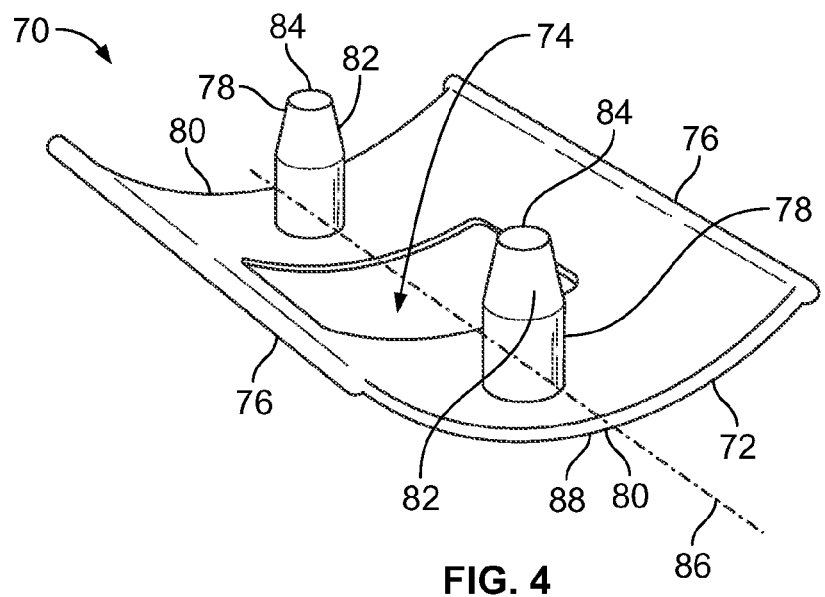
FIG. 4 illustrates an isometric top view of a verification member, according to an embodiment of the present disclosure.

FIG. 4 illustrates an isometric top view of a verification member 70, according to an embodiment of the present disclosure. The verification member 70 may be a diaphragm, flexible plate, sheet, or the like formed from a single piece of elastomeric material, such as rubber. For example, the verification member 70 may be formed from injection molded rubber. Optionally, the verification member 70 may be formed of other resilient materials, such as flexible plastic or metal.

The verification member 70 includes a base sheet 72, which may include a central opening 74. Tubular outer pivot beams 76 may extend from lateral edges of the base sheet 72. Verification indicators 78, such as plungers, posts, or the like, may extend upwardly from the base sheet 72 proximate to ends 80. Each verification indicator 78 may include a column 82 having a beveled tip 84. As shown, the verification indicators 78 are generally aligned along a longitudinal axis 86 of the verification member 70 and separated from one another by the central opening 74. Each verification indicator 78 is configured to align with an anchoring-verification window (shown in FIGS. 2 and 3) of the assembly 10. Alternatively, the verification member 70 may not include the central opening 74. Additionally, the verification member 70 may include more or less verification indicators 78 than shown. The verification indicators 78 are configured to provide an individual installer visual verification as to whether or not the assembly 10 is properly anchored to a structure.

In an at-rest position, the base sheet 72 may downwardly bow or may be otherwise downwardly biased. In the at-rest position, a central portion 88 of the base sheet 72 is downwardly biased underneath the plane in which the outer beams 76 reside.

Figure 5:
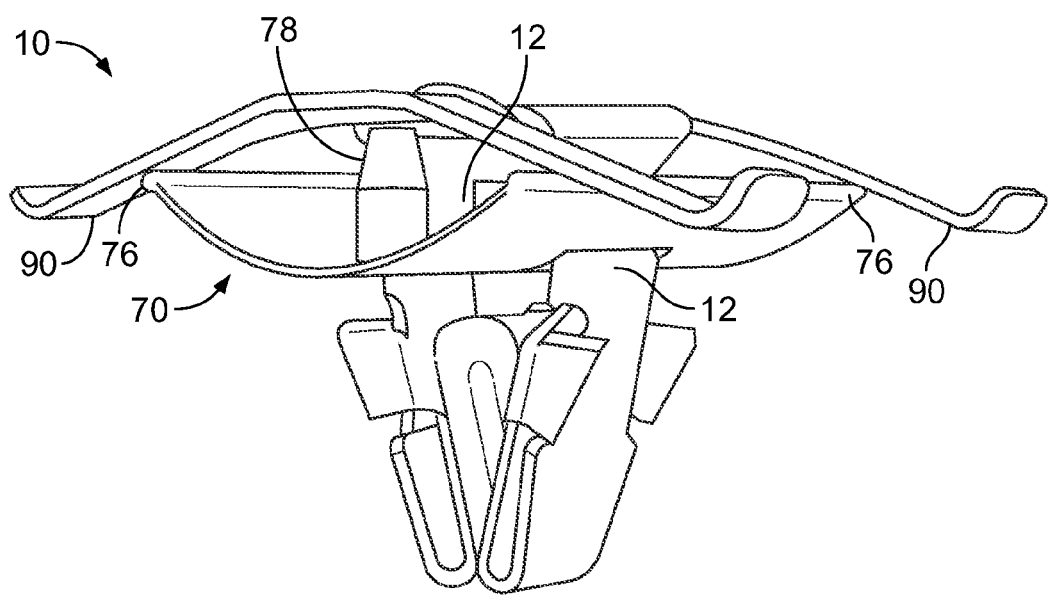
FIG. 5 illustrates an isometric lateral view of an airbag anchoring clip assembly having a verification member, according to an embodiment of the present disclosure.

FIG. 5 illustrates an isometric lateral view of the airbag anchoring clip assembly 10 having the verification member 70, according to an embodiment of the present disclosure. FIG. 6 illustrates an isometric top view of the airbag anchoring clip assembly 10 having the verification member 70. Referring to FIGS. 5 and 6, the verification member 70 is secured to the assembly 10 such that the central opening 74 (shown in FIG. 4) fits around the main body 12. For example, the verification member 70 may be press fit around the main body 12. The tubular outer beams 76 abut into bottom surfaces 90 of the resilient beams 30 of the anchoring members 16. The verification indicators 78 are positioned underneath, and aligned with, the anchoring-verification windows 60.

In operation, the assembly 10 is connected to a portion of a vehicle, such as a frame, panel, or the like. When the assembly 10 is securely anchored to the portion of the vehicle, the verification indicators 78 are urged through the anchoring-verification windows 60, thereby providing an unmistakable visual indication that the assembly is securely anchored to the portion of the vehicle.

FIG. 7 illustrates a simplified cross-sectional view of the airbag anchoring clip assembly 10 in an unsecured position, according to an embodiment of the present disclosure. In the unsecured position, the base sheet 72 is downwardly bowed, such that the verification indicators 78 are positioned below the anchoring-verification windows 60.

FIG. 8 illustrates a simplified cross-sectional view of the verification member 70 in relation to an anchoring-verification window 60 of the airbag anchoring clip assembly 10 in an unsecured position, according to an embodiment of the present disclosure. In the unsecured position, the verification indicators 78 are below the anchoring-verification windows 60. However, as the assembly is securely anchored into position, the resilient beams 30 of the anchoring members 16 flatten, thereby sandwiching the base sheet 72 against a portion of a vehicle. As a result, the base sheet 72 also flattens, thereby forcing the verification indicators 78 through the anchoring-verification windows 60 in the direction of arrow 100. Once the verification indicators 78 pass through the anchoring-verification windows 60, the assembly 10 is anchored to the portion of the vehicle, as the resilient beams 30 are flattened, which ensures that the anchoring protuberances 34 are received and retained within reciprocal features formed in the vehicle frame, panel, or the like. That is, the passage of the verification indicators 78 through the anchoring-verification windows 60 indicates that the resilient beams 30 are flattened, thereby causing the anchoring protuberances 34 to fully and securely anchor into the reciprocal features of the vehicle frame or panel. As a consequence, the passage of the verification indicators 78 through the anchoring-verification windows 60 provides a visual indication that the assembly 10 is securely anchored to a portion of the vehicle.

FIG. 9 illustrates a simplified cross-sectional view of the verification member 70 in relation to an anchoring-verification window 60 of the airbag anchoring clip assembly 10 in an anchored position, according to an embodiment of the present disclosure. In the anchored position, the resilient beams 30 are flattened, which causes the base sheet 72 to compressively sandwich and flatten between the resilient beams 30 and a portion of a vehicle structure, which forces the verification indicators 78 through the anchoring-verification windows 60. When the verification indicators 78 pass through the anchoring-verification windows 60, the assembly 10 is securely anchored to the portion of the vehicle. The passage of the verification indicators 78 through the anchoring-verification windows 60, as shown in FIG. 9, provides a visual indication that the assembly 10 is securely anchored to the portion of the vehicle.

Figure 10:
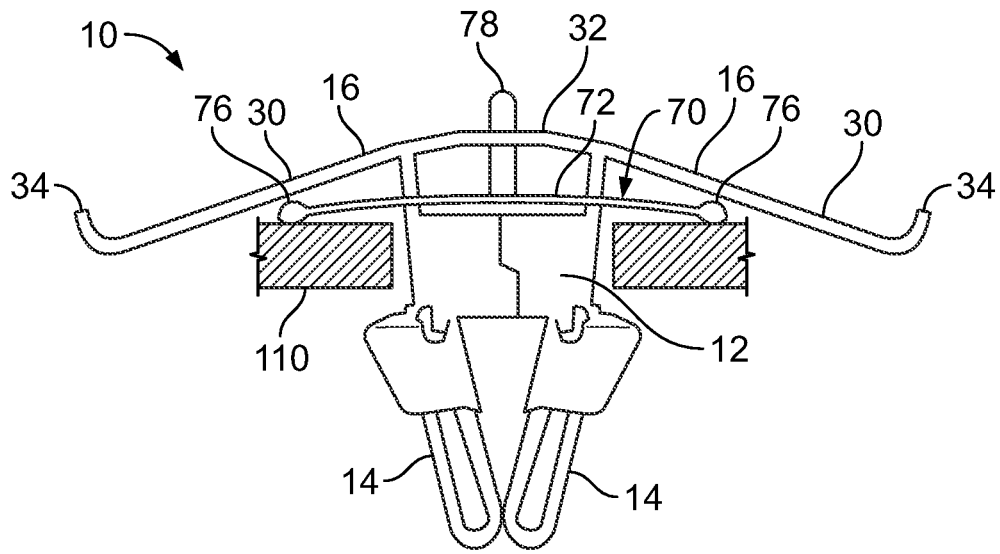
FIG. 10 illustrates a lateral view of an airbag anchoring clip assembly secured to a base panel of an airbag, according to an embodiment of the present disclosure.

FIG. 10 illustrates a lateral view of an airbag anchoring clip assembly 10 secured to a base panel 110 of an airbag, according to an embodiment of the present disclosure. The base panel 110 may form part of an airbag assembly that secures to the assembly 10. The base panel 110 is sandwiched between a vehicle frame or panel (not shown in FIG. 10) and undersides of the anchoring members 16. When the assembly 10 is secured to the vehicle frame or panel and the base panel 110, the anchoring beams 16 flatten, as discussed above. However, the anchoring members 16 are not shown in fully flattened positions in FIG. 10. As the anchoring members 16 flatten, the base sheet 72 flattens between the anchoring members 16 and the base panel 110, which forces the verification indicators 78 to extend through the anchoring-verification windows 60 (shown in FIGS. 2 and 3, for example). Once the verification indicators 78 pass through the alignment windows, a visual indication that the assembly 10 is securely anchored to the base panel 110 and a portion of the vehicle (such as a frame, panel, or the like) is provided to an installer. As such, the installer does not need to further inspect or manipulate the assembly 10 to determine whether the assembly 10 is securely anchored to the vehicle and the airbag assembly. Instead, the verification member 70 provides an unmistakable visual indication that verifies when the assembly 10 is anchored to a structure.

Figure 11:
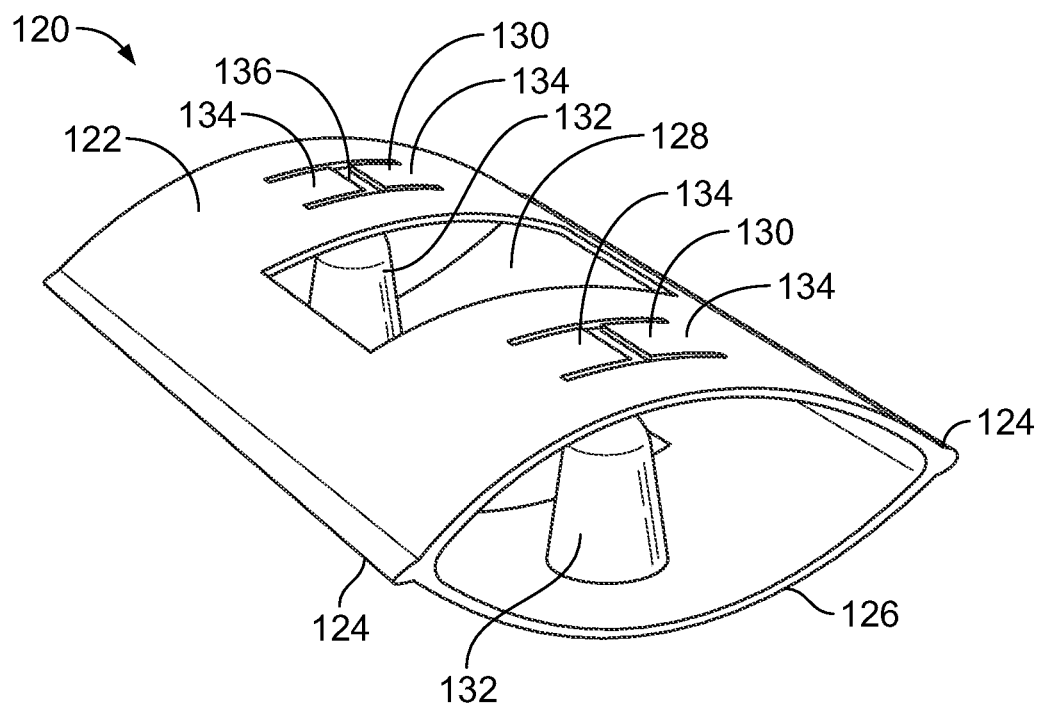
FIG. 11 illustrates an isometric top view of a verification member, according to an embodiment of the present disclosure.
Figure 12:
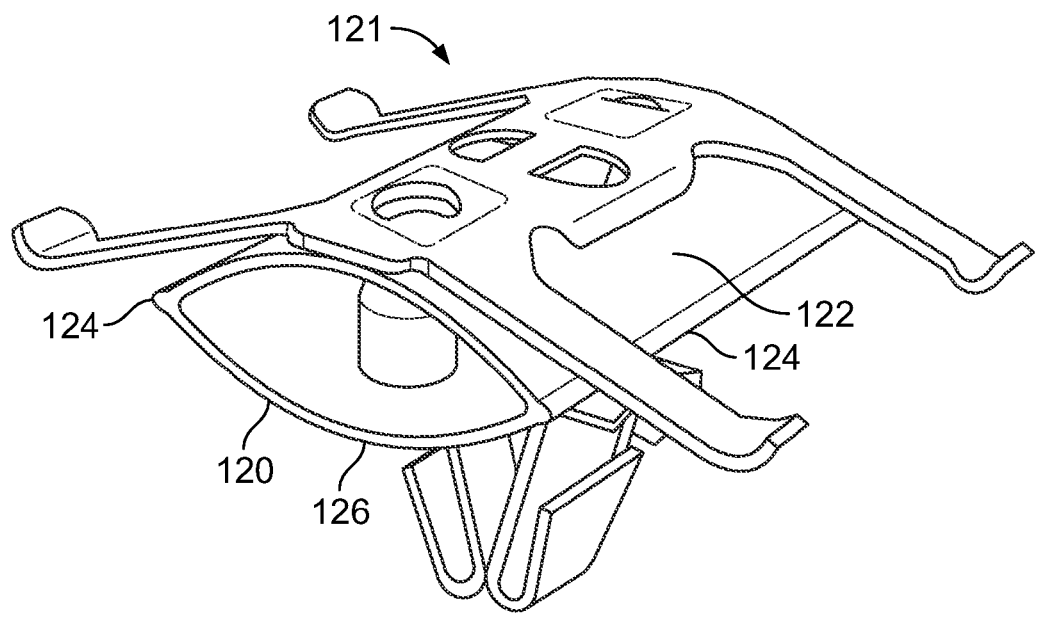
FIG. 12 illustrates an isometric top view of an airbag anchoring clip assembly having a verification member, according to an embodiment of the present disclosure.
Figure 13:
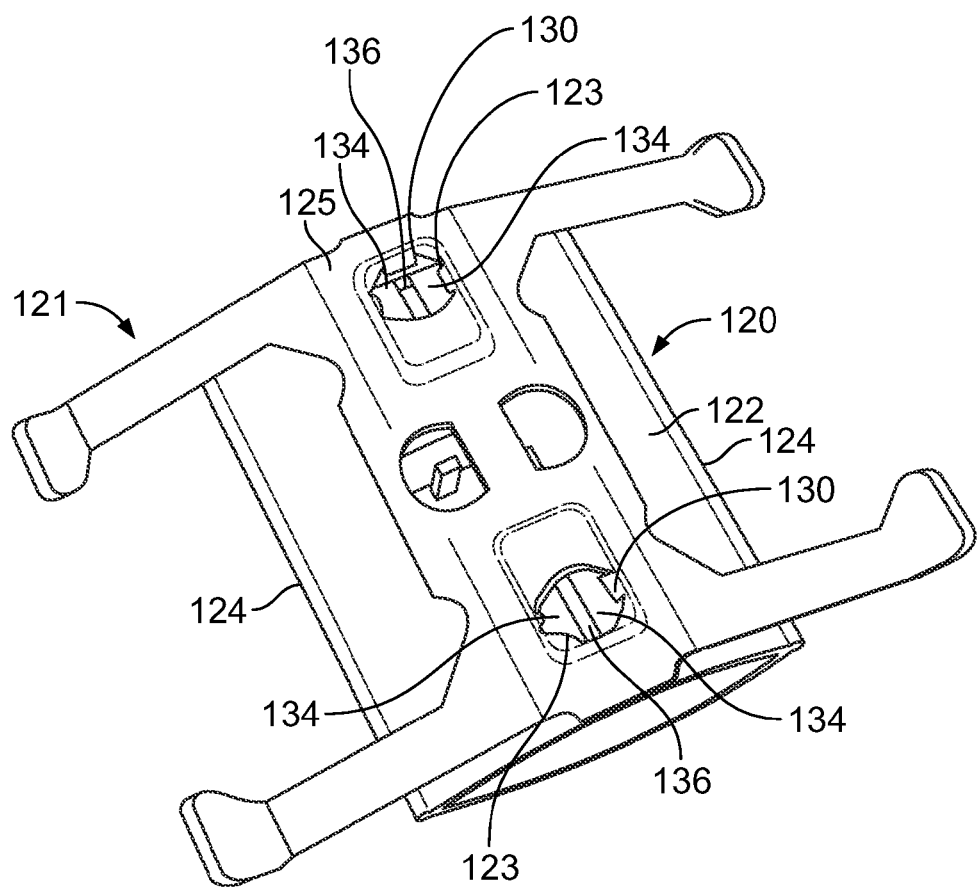
FIG. 13 illustrates a top view of an airbag anchoring clip assembly having a verification member, according to an embodiment of the present disclosure.

FIG. 11 illustrates an isometric top view of a verification member 120, according to an embodiment of the present disclosure. FIGS. 12 and 13 illustrate isometric top and top views, respectively, of an airbag anchoring clip assembly 121 having the verification member 120, according to an embodiment of the present disclosure. Referring to FIGS. 11-13, the verification member 120 is similar to the verification member 70 shown in FIG. 4, except that the verification member 120 includes an upwardly bowed sheet 122 connected between the outer lateral beams 124. As such, in the at-rest position, the base sheet 126 downwardly bows, while the upwardly bowed sheet 122 upwardly bows from the lateral beams 124. The sheet 122 also includes a central passage 128 configured to receive a main body of an airbag anchoring clip assembly. The sheet 122 may be press fit around a portion of the main body.

Referring to FIG. 11, in particular, wiper seals 130 are formed in the sheet 122 above verification indicators 132. The wiper seals 130 are configured to be aligned with anchoring-verification windows 123 formed through a top wall 125 of the assembly 121, as shown in FIG. 13, in particular. Each wiper seal 130 includes opposed flaps 134 separated by a gap 136. When the verification member 120 is flattened, the verification indicators 132 pass into the gaps 136, and force the opposed flaps 134 open. During this movement, the opposed flaps 134 exert a wiping force into the outer surfaces of the verification indicators 132. The force exerted by the opposed flaps into the verification indicators 132 may inhibit the verification indicators 132 from passing therethrough. As such, the wiper seals 130 may provide an indication of anchoring that requires increased force, as compared to the verification member 70. The increased force for indication of anchoring may leave little to no doubt that the airbag anchoring clip assembly 121 is fully and securely anchored to a portion of a vehicle.

FIG. 14 illustrates an isometric top view of an airbag anchoring clip assembly 200, according to an embodiment of the present disclosure. The assembly 200 includes a main body 202, one or more insertion members 204, and one or more anchoring members 206, as discussed above. Additionally, the assembly 200 may include a verification member, such as a verification handle 208, secured to a top wall 210 of the main body 202. The verification handle 208 provides a tactile, graspable device that is configured to allow an installer to detect whether or not the assembly 200 is securely anchored to a portion of a vehicle. The verification handle 208 may be a separable portion that is configured to separate from the main body 202 after the anchoring members are securely anchored to a structure.

The verification handle 208 includes a base 212 including mating features that removably mate with reciprocal features of the top wall 210. The base 212 connects to lateral walls 214 and end walls 216, which, in turn, connect to an upper wall 218. The lateral walls 214 may be inwardly-curved to accommodate grasping with fingers.

FIG. 15 illustrates a top plan view of the airbag anchoring clip assembly 200, according to an embodiment of the present disclosure. As shown in FIG. 15, the verification handle 208 may be generally aligned about a center of the assembly 200.

FIG. 16 illustrates a transverse cross-sectional view of the airbag anchoring clip assembly 200, according to an embodiment of the present disclosure. The base 212 may include securing members 220, such as clamps, clasps, latches, or the like, that are configured to snapably, latchably, or otherwise removably secure to or around portions of the top wall 210 of the main body 202 of the assembly 200. As shown, the lateral walls 214 and the top wall 218 of the verification handle 208 may be inwardly curved to provide an ergonomic graspable surface that may be easily grasped and manipulated by fingers and thumbs 230 of an individual.

When the assembly 200 is not connected to a portion of a vehicle, the verification handle 208 may only be removed from the top wall 210 of the assembly 200 through the use of two hands. For example, in order to remove the verification handle 208, an installer may need to grasp the verification handle 208 with one hand, and hold the main body 202, for example, with another hand, and then pull the two components apart. During this movement, the installer applies sufficient force to overcome the mating connection between the securing members 220 and the top wall 210. However, the installer may be generally unable to separate the verification handle 208 from the main body 202 using only one hand. That is, if the installer grasped only the verification handle 208 and pulled upward, the rest of the assembly 200 would follow the movement, as there would be no opposing force that would allow for separation between the components. A similar principle is applied to allow the verification handle 208 to be separated from the main body 202 after the assembly 200 has been securely anchored to a structural feature of a vehicle.

Figure 18:
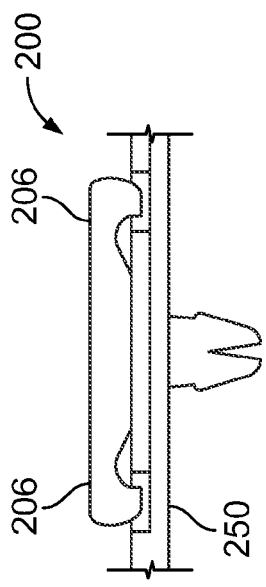
FIG. 18 illustrates a transverse cross-sectional view of an airbag anchoring clip assembly positioned on a structure of a vehicle, according to an embodiment of the present disclosure.
Figure 19:
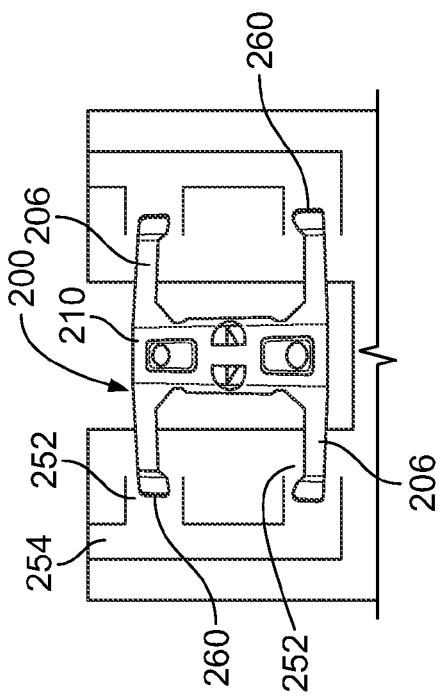
FIG. 19 illustrates a top view of an airbag anchoring clip assembly securely anchored to a structure of a vehicle, according to an embodiment of the present disclosure.

FIG. 17 illustrates a top view of the airbag anchoring clip assembly 200 positioned on a structure 250 of a vehicle, according to an embodiment of the present disclosure. FIG. 18 illustrates a transverse cross-sectional view of the airbag anchoring clip assembly 200 positioned on the structure 250 of the vehicle. FIG. 19 illustrates a top view of the airbag anchoring clip assembly 200 securely anchored to the structure 250 of the vehicle, according to an embodiment of the present disclosure.

Referring to FIGS. 17-19, the structure 250 may be a portion of a vehicle frame, panel, column, pillar, or the like. The structure 250 includes receiving channels 252 configured to receive the anchoring members 206. The receiving channels 252 are connected to locking channels 254, which are generally perpendicular to the receiving channels 252.

As shown in FIG. 17, in particular, the assembly 200 is not in an anchored position with respect to the structure 250. The anchoring protuberances 260 are simply positioned within the receiving channels 252, but are not securely mated with any locking feature. Thus, when the verification handle 208 (shown in FIGS. 14-16) is connected to the top wall 210, if pulled upward, the entire assembly 200 would be removed from the structure 250.

In order to anchor the assembly 200 to the structure 250, the verification handle 208 is pushed downwardly, which forces the anchoring members 206 to flatten. As the anchoring members 206 flatten, the anchoring protuberances 260 are urged into the locking channels 254 and catch on walls defining the locking channels 254, as depicted in FIG. 19. As such, the anchoring members 206 are prevented from retreating back into the receiving channels 252, and the assembly 200 is locked in place. Accordingly, an anchoring force may be provided that counters an upward pulling force exerted into the verification handle 208. Consequently, as the verification handle 208 is urged upwardly, the anchored assembly 200 exerts an equal but opposite force into the interface between the verification handle 208 and the top wall 210. The counteracting forces allow the verification handle 208 to be removed from the assembly 200. As such, the verification handle 208 may be removed from the assembly 200 with only one hand after the assembly 200 is securely anchored to the structure 250.

The verification handle 208 may be used with any of the embodiments described above, including the embodiments shown and described in FIGS. 1-13. The verification handle 208 shown in FIGS. 14-16 may be various shapes and sizes other than shown. For example, the verification handle 208 may be a spherical knob.

Figure 20:
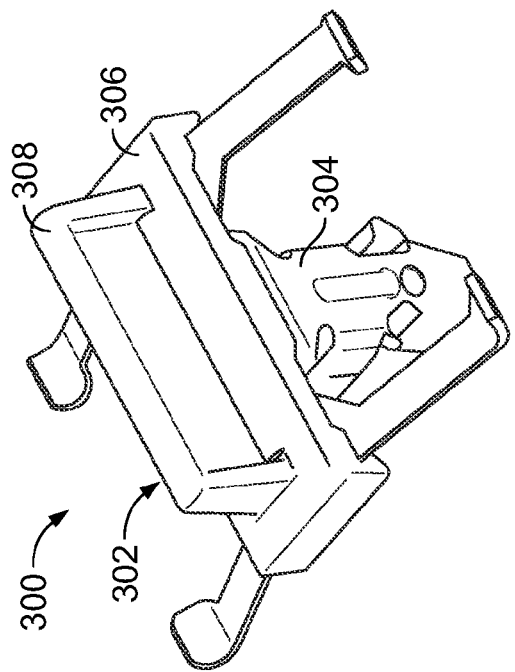
FIG. 20 illustrates an isometric top view of an airbag anchoring clip assembly, according to an embodiment of the present disclosure.

FIG. 20 illustrates an isometric top view of an airbag anchoring clip assembly 300, according to an embodiment of the present disclosure. The assembly 300 may include a verification member, such as a verification handle 302 secured over a main body 304. The verification handle 302 may include a covering sheet 306 having a graspable member 308, such as a fin, wall, planar sheet, or the like, extending upwardly therefrom.

Figure 21:
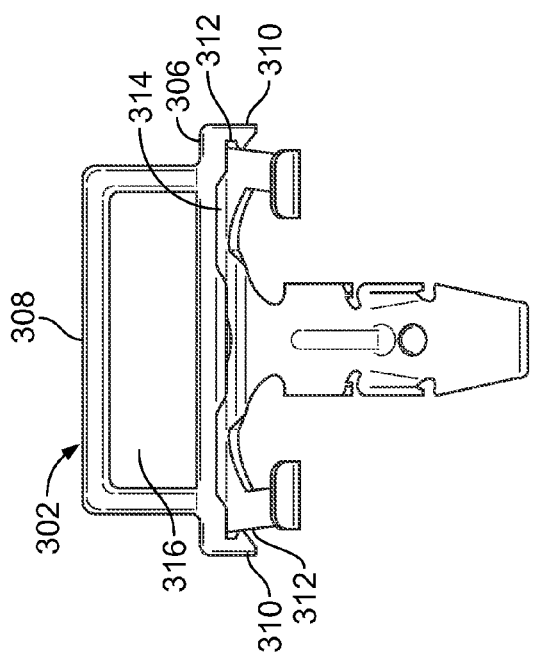
FIG. 21 illustrates a lateral view of an airbag anchoring clip assembly, according to an embodiment of the present disclosure.

FIG. 21 illustrates a lateral view of the airbag anchoring clip assembly 300, according to an embodiment of the present disclosure. The covering sheet 306 may include securing members 310, such as clamps, clasps, snaps, or the like, that removably secure over and/or to ends 312 of a top wall 314. The graspable member 308 may include a recessed central area 316 configured to allow an installer to comfortably and securely grasp.

FIG. 22 illustrates a partial internal view of the airbag anchoring clip assembly 300, according to an embodiment of the present disclosure. As shown in FIG. 22, the assembly 300 may include columns 320 that are configured to be received within alignment windows formed through the top wall 314.

The verification handle 302 may be used to verify that the assembly 300 is securely anchored to a vehicle structure, as described above. For example, when the assembly 300 is securely anchored to the structure, an installer may remove the verification handle 302 from the top wall 314 with one hand.

The verification handle 302 may be used with any of the embodiments described above, including the embodiments shown and described in FIGS. 1-13. The verification handle 302 shown in FIGS. 20-22 may be various shapes and sizes other than those shown.

Figure 23:
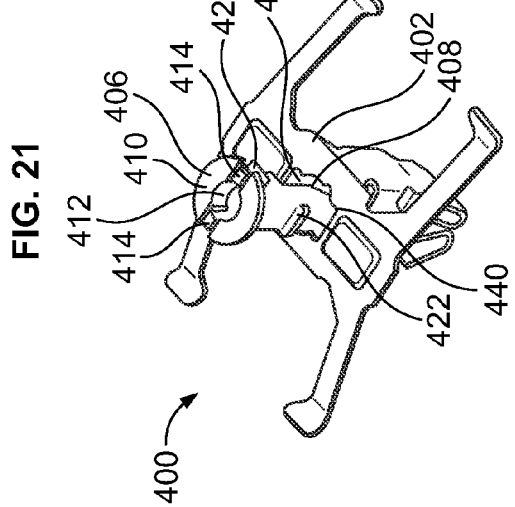
FIG. 23 illustrates an isometric top view of an airbag anchoring clip assembly in a pre-assembled state, according to an embodiment of the present disclosure.

FIG. 23 illustrates an isometric top view of an airbag anchoring clip assembly 400 in a pre-assembled state, according to an embodiment of the present disclosure. The assembly 400 includes a main body 402 having a central passage 404, and a verification member, such as a verification pin 406, positioned within the central passage 404. The verification pin 406 is a separable portion that is configured to separate from the main body 402 after the anchoring members are securely anchored to a structure.

The verification pin 406 includes a shaft 408 connected to a head 410. The head 410 includes a central passage 412 that may be configured to receive a distal end of a tool. Opposed flex prongs 414 are positioned on the head 410. An upper tab 420 may extend radially from the shaft 408 below the head 410. A lower tab 422 may extend radially from the shaft 408 below the upper tab 420. The upper tab 420 and the lower tab 422 may be shifted 90° out of axial alignment with respect to one another.

The pin 406 is inserted into the central passage 404, such that the lower tab(s) 422 is aligned with a reciprocal passage(s) 440 formed through the main body 402. Once aligned, the pin 406 is pushed down so that the tab 422 passes through the reciprocal passage 440.

Figure 24:
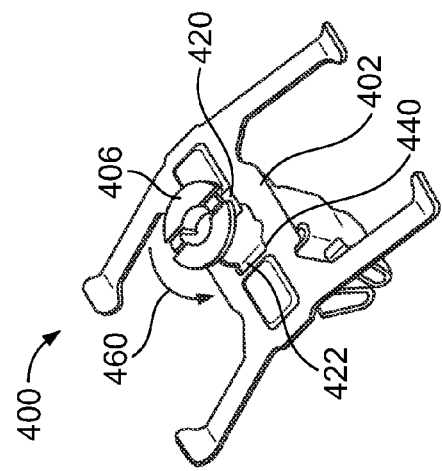
FIG. 24 illustrates an isometric top view of an airbag anchoring clip assembly in an assembled state, according to an embodiment of the present disclosure.

FIG. 24 illustrates an isometric top view of the airbag anchoring clip assembly 400 in an assembled state, according to an embodiment of the present disclosure. Once the tab 422 passes through the passage 440, the upper tab 420 rests on an upper surface of the main body 402, thereby preventing the pin 406 from further downward movement. In order to fully insert the pin 406, the pin 406 is rotated in the direction of arc 460 so that the upper tab 420 aligns with the passage 440.

Figure 25:
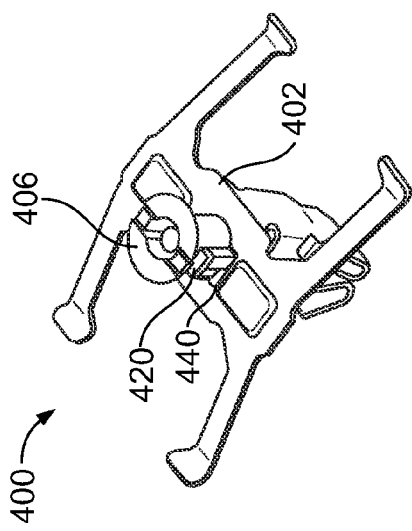
FIG. 25 illustrates an isometric top view of an airbag anchoring clip assembly in a verification state, according to an embodiment of the present disclosure.

FIG. 25 illustrates an isometric top view of the airbag anchoring clip assembly 400 in a verification state, according to an embodiment of the present disclosure. Once the upper tab 420 is aligned with the passage 440, the pin 406 may be further urged down into the main body 402 of the assembly 400.

Figure 26:
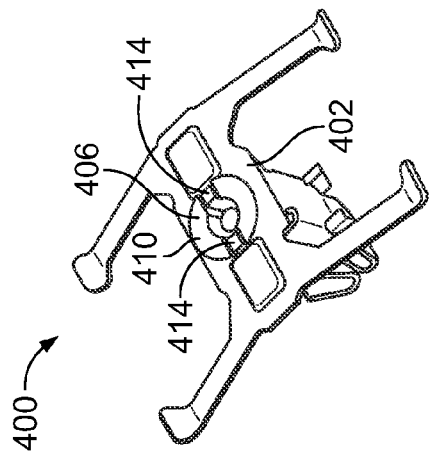
FIG. 26 illustrates an isometric top view of an airbag anchoring clip assembly in a fully secured state, according to an embodiment of the present disclosure.

FIG. 26 illustrates an isometric top view of the airbag anchoring clip assembly 400 in a fully secured state, according to an embodiment of the present disclosure. As the pin 406 is further urged down, the head 410, having a larger diameter than the central passage 412, is prevented from further downward movement. The opposed flex prongs 414 snap into a secure engagement with the main body 402. In this position, the assembly 400 may be urged into a structure of a vehicle in order to securely anchor the assembly 400 to a portion of the vehicle. In order to determine whether the assembly 400 is securely anchored, a user may pinch the flex prongs 414 together in order to allow the head 410 to be pulled up.

When the head 410 is pulled up, the pin 406 is moved upwardly from the main body 402, as shown in FIG. 25. If the assembly 400 is not anchored to the structure, additional pulling movement on the pin 406 causes the main body 402, and the rest of the assembly 400, to follow movement, thereby removing the assembly 400 from the structure. However, when the assembly 400 is properly anchored, the main body 402 remains securely anchored to the structure, and further pulling movement on the pin 406 causes the pin 406 to be removed, while the main body 402 remains secured to the structure.

Figure 27:
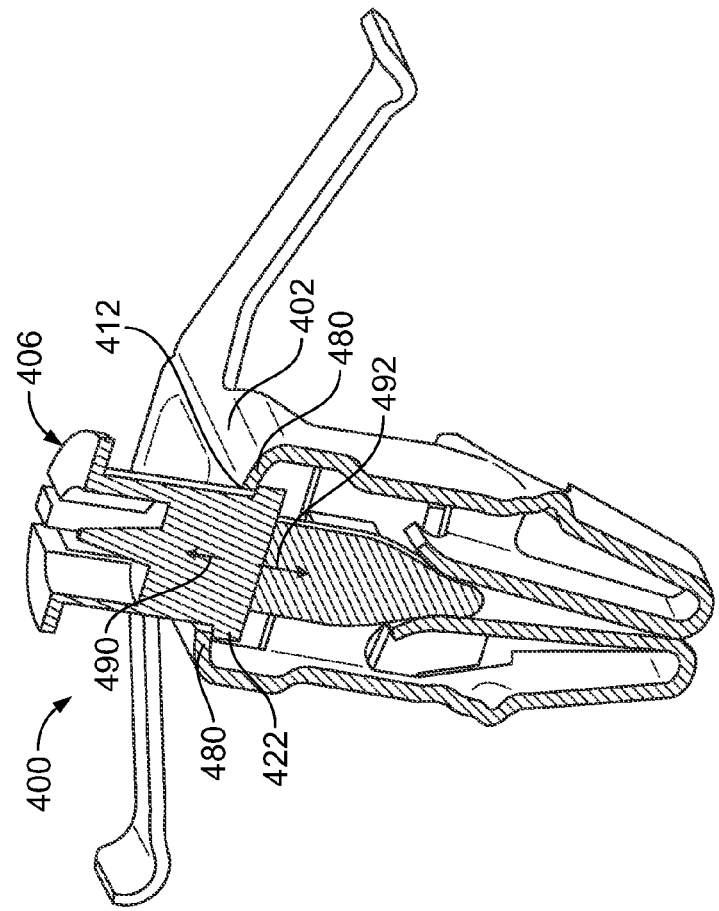
FIG. 27 illustrates a partial internal view of an airbag anchoring clip assembly in a verification state, according to an embodiment of the present disclosure.

FIG. 27 illustrates a partial internal view of the airbag anchoring clip assembly 400 in the verification state, according to an embodiment of the present disclosure. In the verification state, the lower tabs 422 abut against bottom surfaces of edges 480 of the main body 402 that define the central passage 412. If the main body 402 is not securely anchored to a structure, when the pin 406 is urged upwardly in the direction of arrow 490, the entire assembly 400 will follow, as there is no anchoring counter force. However, when the main body 402 is anchored to the structure, the force exerted in the direction of arrow 490 is countered by an opposite anchoring force in the direction of arrow 492. As such, a suitable amount of force in the direction of arrow 490, causes the edges 480 to separate further, thereby allowing the pin 406 to be removed.

The embodiments shown in FIGS. 23-27 may be used in conjunction with any of the embodiments described with respect to FIGS. 1-22.

Referring to FIGS. 1-27, embodiments of the present disclosure provide clip assemblies that include one or more verification members that allow an installer to quickly and easily determine whether or not the clip assembly is securely anchored to a structure. The verification members may include a visual indication, such as a verification indicator popping though a portion of a main body of the assembly, and/or separation of a verification handle from the main body. Embodiments of the present disclosure provide systems and method of quickly and easily determining whether a clip assembly is securely anchored to a structure.

Embodiments of the present disclosure have been described with respect to airbags and vehicles. However, embodiments of the present disclosure provide anchoring clip assemblies that may be used with various applications, whether or not they are used with an airbag and/or a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. An anchoring clip assembly configured to securely anchor to a structure of a vehicle, the anchoring clip assembly comprising:
   a main body;
   one or more insertion members extending from the main body, wherein the one or more insertion members are configured to be inserted into a portion of the structure;
   one or more anchoring members extending from the main body, wherein the one or more anchoring members are configured to securely anchor to the structure; and
   at least one verification member configured to provide verification when the one or more anchoring members are securely anchored to the structure, wherein the at least one verification member in its entirety is moveable relative to the main body, the one or more insertion members, and the one or more anchoring members, into a verification position that unmistakably verifies that the one or more anchoring members are securely anchored to the structure; wherein the one or more anchoring members are configured to securely anchor to the structure independently from the at least one verification member.

2. The anchoring clip assembly of claim 1, wherein the at least one verification member provides visual verification when the one or more anchoring members are securely anchored to the structure.

3. The anchoring clip assembly of claim 2, wherein the at least one verification member comprises:
   a base sheet having a central opening formed therethrough, wherein the main body is configured to be positioned through the central opening;
   outer pivot beams extending from distal edges of the base sheet; and at least one verification indicator extending from the base sheet, wherein the at least one verification indicator is configured to extend through a portion of the main body when the one or more anchoring members are securely anchored to the structure.

4. The anchoring clip assembly of claim 3, wherein the at least one verification member further comprises an opposed sheet over the base sheet, wherein the opposed sheet comprises at least one wiper seal aligned with the at least one verification indicator, wherein the at least one verification indicator is configured to pass through the at least one wiper seal when the one or more anchoring members are securely anchored to the structure.

5. The anchoring clip assembly of claim 3, wherein the base sheet is outwardly bowed in an at-rest position.

6. The anchoring clip assembly of claim 3, wherein the at least one verification indicator comprises an upstanding column having a beveled tip.

7. The anchoring clip assembly of claim 1, wherein the at least one verification member includes at least one separable portion that is configured to separate from the main body after the one or more anchoring members are securely anchored to the structure.

8. The anchoring clip assembly of claim 1, wherein the at least one verification member comprises a verification handle that is configured to be separated from the main body when the one or more anchoring members are securely anchored to the structure.

9. The anchoring clip assembly of claim 8, wherein the verification handle is configured to be removed from the main body with one hand when the one or more anchoring members are securely anchored to the structure, and wherein the verification handle is unable to be removed from the main body with one hand when the one or more anchoring members are not securely anchored to the structure.

10. The anchoring clip assembly of claim 1, wherein the at least one verification member comprises a verification pin that is configured to be separated from the main body when the one or more anchoring members are securely anchored to the structure.

11. The anchoring clip assembly of claim 10, wherein the verification pin is configured to be removed from the main body with one hand when the one or more anchoring members are securely anchored to the structure, and wherein the verification pin is unable to be removed from the main body with one hand when the one or more anchoring members are not securely anchored to the structure.

12. An anchoring clip assembly configured to securely anchor to a structure, the anchoring clip assembly comprising:
a main body;
a plurality of anchoring members extending from the main body, wherein the plurality of anchoring members are configured to securely anchor to the structure; and
at least one verification member configured to provide verification when the plurality of anchoring members are securely anchored to the structure, wherein the at least one verification member provides visual verification when the plurality of anchoring members are securely anchored to the structure, or includes at least one separable portion that is configured to separate from the main body after the plurality of anchoring members are securely anchored to the structure, wherein the at least one verification member is moveable relative to the main body and the plurality of anchoring members into a verification position that unmistakably verifies that the plurality of anchoring members are securely anchored to the structure.

13. The anchoring clip assembly of claim 12, wherein the at least one verification member comprises:
a base sheet having a central opening formed therethrough, wherein the main body is configured to be positioned through the central opening;
outer pivot beams extending from distal edges of the base sheet; and
at least one verification indicator extending from the base sheet, wherein the at least one verification indicator is configured to extend through a portion of the main body when the plurality of anchoring members are securely anchored to the structure.

14. The anchoring clip assembly of claim 13, wherein the at least one verification member further comprises an opposed sheet over the base sheet, wherein the opposed sheet comprises at least one wiper seal aligned with the at least one verification indicator, wherein the at least one verification indicator is configured to pass through the at least one wiper seal when the plurality of anchoring members are securely anchored to the structure.

15. The anchoring clip assembly of claim 12, wherein the at least one verification member comprises a verification handle that is configured to be separated from the main body when the plurality of anchoring members are securely anchored to the structure.

16. The anchoring clip assembly of claim 15, wherein the verification handle is configured to be removed from the main body with one hand when the one or more anchoring members are securely anchored to the structure, and wherein the verification handle is unable to be removed from the main body with one hand when the one or more anchoring members are not securely anchored to the structure.

17. The anchoring clip assembly of claim 12, wherein the at least one verification member comprises a verification pin that is configured to be separated from the main body when the one or more anchoring members are securely anchored to the structure.

18. An anchoring clip assembly configured to securely anchor an airbag to a structure of a vehicle, the anchoring clip assembly comprising:
a main body;
opposed insertion members extending from the main body, wherein the opposed insertion members are configured to be inserted into a portion of the structure;
two pairs of anchoring members extending from the main body, wherein the two pairs of anchoring members are configured to securely anchor to the structure; and
at least one verification member configured to provide verification when the two pairs of anchoring members are securely anchored to the structure, wherein the at least one verification member provides visual verification when the two pairs of anchoring members are securely anchored to the structure, and includes at least one separable portion that is configured to separate from the main body after the two pairs of anchoring members are securely anchored to the structure, wherein the at least one verification member in its entirety is moveable relative to the main body, the opposed insertion members, and the two pairs of anchoring members into a verification position that unmistakably verifies that the two pairs of anchoring members are securely anchored to the structure; wherein the two pairs of anchoring members are configured to securely anchor to the structure independently from the at least one verification member.

19. The anchoring clip assembly of claim 18, wherein the at least one verification member comprises:
- a base sheet having a central opening formed therethrough, wherein the main body is configured to be positioned through the central opening;
- outer pivot beams extending from distal edges of the base sheet; and
- at least one verification indicator extending from the base sheet, wherein the at least one verification indicator is configured to extend through a portion of the main body when the two pairs of anchoring members are securely anchored to the structure.

20. The anchoring clip assembly of claim 19, further comprising an opposed sheet over the base sheet, wherein the opposed sheet comprises at least one wiper seal aligned with the at least one verification indicator, wherein the at least verification indicator is configured to pass through the at least one wiper seal when the two pairs of anchoring members are securely anchored to the structure.

21. The anchoring clip assembly of claim 18, wherein the at least one verification member comprises a verification handle that is configured to be separated from the main body when the two pairs of anchoring members are securely anchored to the structure.

22. The anchoring clip assembly of claim 18, wherein the at least one verification member comprises a verification pin that is configured to be separated from the main body when the two pairs of anchoring members are securely anchored to the structure.

23. The anchoring clip assembly of claim 18, wherein the at least one verification member is configured to be removed from the main body with one hand when the two pairs of anchoring members are securely anchored to the structure, and wherein the at least one verification member is unable to be removed from the main body with one hand when the two pairs of anchoring members are not securely anchored to the structure.

24. The anchoring clip assembly of claim 1, wherein the at least one verification member does not secure to the structure.

25. The anchoring clip assembly of claim 12, wherein the at least one verification member does not secure to the structure.

26. The anchoring clip assembly of claim 18, wherein the at least one verification member does not secure to the structure.

* * * * *